United States Patent [19]

Degen et al.

[11] Patent Number: 5,318,866
[45] Date of Patent: Jun. 7, 1994

[54] BATTERY SEPARATORS

[75] Inventors: Peter J. Degen, Huntington; Joseph Lee, South Setauket, both of N.Y.

[73] Assignee: Pall Corporation, East Hills, N.Y.

[21] Appl. No.: 52,250

[22] Filed: Apr. 23, 1993

[51] Int. Cl.$^5$ .......................... H01M 2/16; H01M 4/58
[52] U.S. Cl. .................................. 429/254; 429/249; 429/218; 429/206
[58] Field of Search ............... 429/249, 206, 254, 219, 429/218, 222

[56] References Cited

U.S. PATENT DOCUMENTS

| | | | |
|---|---|---|---|
| 3,892,594 | 7/1975 | Charlesby et al. | 429/137 X |
| 4,024,323 | 5/1977 | Versteegh | 429/249 |
| 4,122,133 | 10/1978 | Bernstein et al. | 429/254 X |
| 4,230,549 | 10/1980 | D'Agostino et al. | 429/192 X |
| 4,234,623 | 11/1980 | Moshtev et al. | 429/249 X |
| 4,810,570 | 3/1989 | Butten et al. | |
| 4,939,181 | 7/1990 | Haselier | |
| 5,066,755 | 11/1991 | Lemstra | |
| 5,069,990 | 12/1991 | Yoshimura et al. | |
| 5,126,219 | 6/1992 | Howard et al. | |

FOREIGN PATENT DOCUMENTS 0438831 12/1990 European Pat. Off. .
0500173 2/1992 European Pat. Off. .

OTHER PUBLICATIONS

Lemstra et al., "Ultra-drawing of High Molecular Weight Polyethylene," *The British Polymer Journal*, 212–214 (Dec. 1980).
Smith et al., "Ultra-drawing of High Molecular Weight Polyethylene Cast from Solution," *Colloid and Polymer Science*, 259 (11), 1070–1080 (1981).
Celanese Technical Information Fabrication & Handling Brochure, "Celgard TM Hollow Fiber," Celanese Corporation (1985).
Celanese Technical Information Brochure, "Celgard ® film," Celanese Corporation (1985).
DSM Engineering Plastics Brochure, "Stamylan ® UH Ultra-High Molecular Weight Polyethylene," DSM Kunstsoffen B.V., Netherlands (Oct. 1989).

*Primary Examiner*—John S. Maples
*Attorney, Agent, or Firm*—Leydig, Voit & Mayer, Ltd.

[57] ABSTRACT

A battery separator comprising an ultra-high molecular weight polyethylene microporous membrane radiation grafted with a monomer, the separator having the following properties:

(a) a porosity ranging from about 50% to about 95%,
(b) an average pore size ranging from about 0.1 to about 20 microns,
(c) an electrolytic resistance ranging from about 1 to about 50 m$\Omega$-in$^2$,
(d) a maximum weight loss of 1% and a change in electrolytic resistance of no greater than 25% after immersion in an aqueous solution of 35% KOH and 5% KMnO$_4$ at 50° C. for 1 hour,
(e) a tensile strength of from about 3.5 to about 5.5 lb/in in both length and width directions,
(f) a KOH absorption ratio of from about 5 to about 30,
(g) a Gurley air permeability of about 1 to 300 sec/10 ml, and
(h) a thickness from about 0.5 mil to about 10 mil.

Further provided is a battery comprising at least one pair of electrodes of opposite polarity, an electrolyte, and a separator of the present invention located between the electrodes of opposite polarity.

23 Claims, 1 Drawing Sheet

BATTERY SEPARATORS

FIELD OF THE INVENTION

The present invention generally relates to batteries and specifically relates to microporous separators for use in batteries.

BACKGROUND OF THE INVENTION

Batteries exist in many different physical forms, using various combinations of electrodes. With the advent of electric vehicles and other machinery, the demand for high energy density batteries has increased. This demand has impacted upon battery design. For such applications, it is desirable to manufacture batteries that have electrodes in close proximity to one another. However, when such batteries are constructed, there is an increased risk of the battery developing an internal short-circuit due to electrode proximity.

As one example of the aforementioned problem, reference is made to alkaline nickel-cadmium batteries. Traditionally, such batteries used a sintered negative electrode. Today, that type of electrode has been replaced by a plastic bonded electrode to increase storage capacity. However, when repeatedly charged and discharged, a battery having a such an electrode is more likely to internally short-circuit earlier than such a battery having a sintered negative electrode. This internal short-circuit problem is caused by a phenomenon known as "migration," in which cadmium active material grows and transfers from the negative electrode to the positive electrode.

One method of overcoming the aforementioned problem has been through the use of microporous separators. The growth of cadmium active material is retarded through a microporous separator, and, therefore, this method can substantially completely prevent internal short-circuits caused by the growth of cadmium active material. One problem with such separators, however, is that they have low gas permeation coefficients, creating the potential for undesirable rupturing or venting of the battery. A second problem arises from the inclusion of surfactants in such separators for the purpose of achieving adequate membrane wettability. Such surfactants eventually leach out of the separator, contaminate the battery environment, and cause premature failure and degradation of the battery.

Wettable battery separators are disclosed in U.S. Pat. No. 5,126,219, and these separators are made of filaments and fibers of ultrahigh molecular weight polyolefins that are formed as a web, having a void volume of at least twenty percent. Wettability is imparted by incorporating a finely divided, hygroscopic filler material into the polyolefin extrusion mixture prior to extrusion. Such a formulation imparts a more permanent wettability to the material than is provided by simple coating, but still presents problems in actual practice.

There are numerous battery systems in existence which require the use of a separator. Unfortunately, each system has its own specific requirements with regard to separator properties. However, certain properties of separators are considered to be desirable regardless of the particular battery system in which they are employed:

(a) thin and reliable separation between positive and negative electrodes,
(b) very low electrolytic resistance in the electrolyte,
(c) long term chemical stability upon exposure to the electrolyte and oxidants, even at elevated temperatures,
(d) ability to absorb and retain a large amount of electrolyte,
(e) good gas permeability, and
(f) high mechanical strength in machine and transverse directions.

No commercially available separators meet all of these criteria.

Thus, there remains a need for such a battery separator, which concurrently possesses a variety of desirable properties. It is an object of the present invention to provide such a battery separator, as well as a battery incorporating such a separator.

These and other objects and advantages of the present invention, as well as additional inventive features, will be apparent from the description of the invention provided herein.

SUMMARY OF THE INVENTION

The present invention provides a battery separator comprising an ultra-high molecular weight polyethylene microporous membrane radiation grafted with a monomer, the separator having the following characteristics:

(a) a porosity ranging from about 50% to about 95%,
(b) an average pore size ranging from about 0.1 to about 20 microns,
(c) an electrolytic resistance ranging from about 1 to about 50 m$\Omega$-in$^2$,
(d) a maximum weight loss of 1% and a change in electrolytic resistance of no greater than 25% after immersion in an aqueous solution of 35% KOH and 5% KMnO$_4$ at 50° C. for 1 hour,
(e) a tensile strength of from about 3.5 to about 5.5 lb/in in both length and width directions,
(f) a KOH absorption ratio of from about 5 to about 30, and
(g) a Gurley air permeability of about 1 to 300 sec/10 ml.

The separator preferably has a thickness of about 0.5 mil to about 10 mil.

The present invention further provides a battery comprising at least one pair of electrodes of opposite polarity, an electrolyte, and a separator of the present invention located between the electrodes of opposite polarity.

DETAILED DESCRIPTION OF THE PREFERRED EMBODIMENTS

Figure 1:
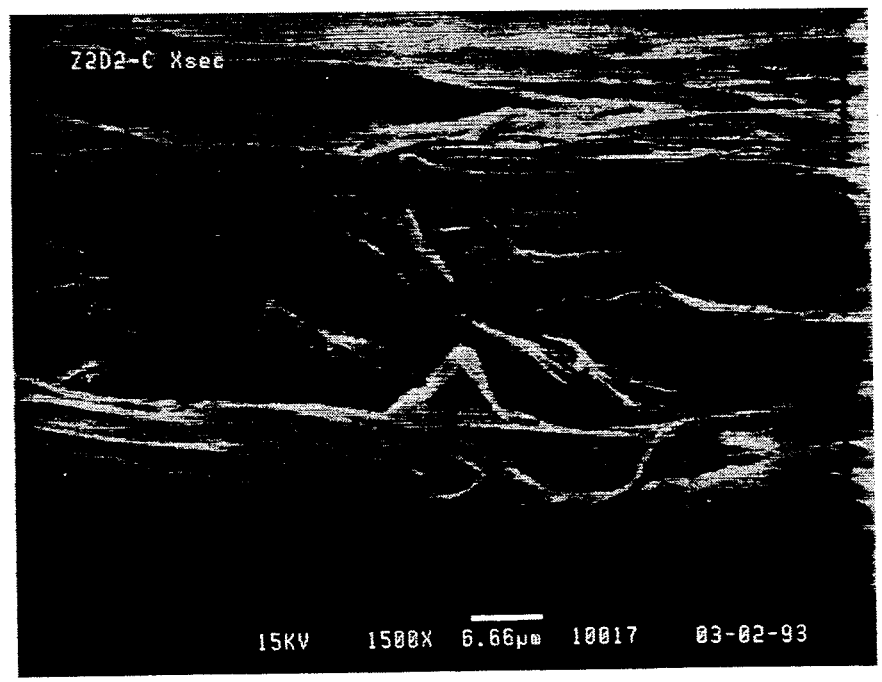
FIG. 1 is scanning electron micrograph of a substrate useful in preparing the battery separator of the present invention.

The present invention provides a battery separator that possesses certain characteristics that have not been concurrently available by battery separators heretofore. In particular, the separator of the present invention has a very low electrolytic resistance in KOH electrolyte providing a very high rate capability. Moreover, the separator is permanently wettable, and there is no surfactant or hygroscopic filler in the separator which could leach from the separator when stored in electrolyte and in water, even for extended periods of time. Accordingly, electrolytic resistance does not change with time. The separators also have high KOH absorbency, high gas permeability, and demonstrate symmetric mechanical strength, with no directional weakness. Further, the separators have excellent stability in KOH electrolyte over a wide range of temperatures ranging from boiling to −40° C., possess excellent oxidation stability, and experience little weight loss when subjected to boiling $KMnO_4/KOH$. The separators are also heat sealable.

Separators of the present invention comprise an ultra-high molecular weight polyethylene microporous membrane radiation grafted with a monomer, the separator having the following characteristics:

(a) a porosity ranging from about 50% to about 95%,
(b) an average pore size ranging from about 0.1 to about 20 microns,
(c) an electrolytic resistance ranging from about 1 to about 50 $m\Omega\text{-in}^2$,
(d) a maximum weight loss of 1% and a change in electrolytic resistance of no greater than 25% after immersion in an aqueous solution of 35% KOH and 5% $KMnO_4$ at 50° C. for 1 hour,
(e) a tensile strength of from about 3.5 to about 5.5 lb/in in both length and width directions,
(f) a KOH absorption ratio of from about 5 to about 30, and
(g) a Gurley air permeability of about 1 to 300 sec/10 ml.

The separator preferably has a thickness of about 0.5 mil to about 10 mil. Advantageously, the separator shrinks no greater than about 2% in length and 1% in width after being maintained at a temperature of 80° C. for one hour, has a CWST ranging from about 72 to about 95 dyne/cm, and has an electrolytic resistance which ranges from about 5 to about 20 $m\Omega\text{-in}^2$. Preferably, the CWST remains constant after extraction in boiling water for 30 minutes.

The battery separator of the present invention is prepared in accordance with the materials and procedures described below.

The Substrate

The starting material is a microporous polyethylene substrate that is made of high molecular weight polyethylene. The polyethylene should have an ultra-high molecular weight ("UHMW"), i.e., a standard load melt index of less than about 0.04 per ten minutes, and preferably 0, when measured in accordance with ASTM D 1238-70 and an intrinsic viscosity greater than about 3.0 (measured in decahydronaphthalene at 135° C.). The preferred UHMW polyethylenes are those having a nominal weight average molecular weight between about 500,000 and about 5 million when measured in accordance with ASTM D 4020-8. It is most preferable to use UHMW polyethylenes in the higher molecular weight range of those disclosed as useful herein. Minor amounts of lower molecular weight polyolefins may be blended therewith. Such UHMW polyethylenes are known in the art, e.g., STAMYLAN UH ® (DSM, Geleen, The Netherlands).

The microporous UHMW polyethylene substrates useful in the present invention should have a stacked, lamellar leaf-like structure with respect to the pores. The leaf-like lamellar structure can be seen under a scanning electron microscope, as shown in the scanning electron micrograph of a useful substrate in FIG. 1, which indicates a tortuous pore structure. In contrast, the straight pore structure of undesirable substrates, such as certain Celgard ® films, is shown in the scanning electron micrographs in the Celgard ® Technical Information-Film brochure (Celanese Corp., 1985). The substrate is preferably prepared by the gel extrusion process disclosed in European Patent 500,173. Such a substrate is commercially available in various grades from DSM (Geleen, The Netherlands) as Microporous UHMW-PE Hydrophobic Battery Separators.

The microporous substrate should have the following properties: a thickness of about 0.5 to about 10 mil, and preferably from about 1 to 5 mil, a basis weight of about 3.0 to about 50 $g/m^2$, a tensile strength of about 3.5 to about 5.5 lb/in in both the machine (length) and transverse (width) directions, a porosity of 50% to 95%, and a pore size of from 0.1 to 20 microns.

Radiation Grafting

The microporous polyethylene substrate is converted to a useful battery separator by rendering it permanently hydrophilic while not adversely altering its original properties, such as air flow, microporosity, mechanical strength, and the like.

Radiation grafting is the preferred technique to achieve such a result. The source of radiation can be from radioactive isotopes like cobalt 60, strontium 90, and cesium 137, or from machines like x-ray machines, electron accelerators, and ultraviolet equipment.

The grafting process also involves the use of active monomers which will render the polyethylene substrate hydrophilic. The selection of specific monomers will depend on the type of battery system. Monomers which are useful for grafting include any materials which are customarily used for grafting polyethylenes, such as, e.g., monomers which contain carboxyl groups. Examples of such monomers include acrylic acid, methacrylic acid, maleic acid, fumaric acid, itaconic acid, sodium acrylate, sodium methacrylate, potassium methacrylate, hydroxyethyl acrylate, hydroxypropyl acrylate, hydroxyethyl methacrylate, and hydroxypropyl methacrylate. Preferred monomers are methacrylic acid and/or hydroxyethyl methacrylate. Mixtures of the aforesaid monomers may also be used.

Grafting will typically be achieved by either of the following procedures. The substrate can be irradiated dry and subsequently soaked in a monomer solution. Alternatively, the substrate can be irradiated in the presence of a monomer solution. The monomer solution will comprise one or more of the monomers described above. The percentage of monomers in the aforesaid solutions can range broadly, from 0.1 wt. % to 100 vol. %. Preferred grafting procedures are described more fully in the examples which follow.

The use of a microporous membrane which has the ability to remain wettable over a long period of time in the formation of a battery separator provides the resulting separator with a greatly enhanced ability to absorb electrolyte as compared with known microporous sheet separators. This property is particularly useful in forming "starved electrolyte" (recombinant) type batteries where the ability of the separator to absorb and retain electrolyte is critical in that the only electrolyte present is that absorbed by the separator and plate. The permanence of the hydrophilicity also provides for better performance and longer battery life.

Separator Evaluation Methods

The separators of the present invention have a variety of properties. Methods for evaluating a separator sample to determine if such properties are met are provided in the following paragraphs.

The procedure for determining the porosity of a separator involves the use of a Gurley Densometer which measures the time it takes to pass a fixed volume of air through the membrane at a given pressure. Shorter times reflect more porous membranes. A more accurate measurement involves measuring the density of the membrane (D) and the density of the bulk polymer ($D_o$) and calculating porosity using the formula:

$$\% \text{ porosity} = \frac{D_o - D}{D_o} \times 100$$

The procedure for determining the average pore size of a separator is the bubble point technique using a Coulter porometer which provides the maximum and mean flow pore sizes.

The procedure for determining the electrolytic resistance of a separator is described in J. Cooper et al., eds., "Characteristics of Separators for Alkaline Silver Oxide-Zinc Secondary Batteries" (Air Force Aeropropulsion Laboratory, Dayton, Ohio, September 1965), Chapter 6B. Samples of the separator to be tested are cut in triplicate, and then soaked in 40% KOH electrolyte for 1 hour at 24°±1° C. The cell used for the testing is Pall RAI Model 2401 and consists of two half cells with platinum electrodes operating at 1000 Hz. Measurements of the cell resistance with the separator in place in the cell ($R_s$), and without the separator ($R_c$), in 40% KOH are recorded. The electrolytic resistance of the separator (R) is given by the equation:

$$R = R_s - R_c$$

The tensile strength of the separator is measured according to ASTM D-638-60T. A table Instron tester is used under the following conditions: 1½×½ inch sample, 1 inch grip separation, 2 inch/minute strain rate, and 23° C. temperature. The tensile strength at break is calculated as F/W, wherein F is the load at break (lb) and W is the width of the sample (inch). The percent elongation is determined by subtracting the initial distance between the grip from the elongation at break and dividing this result by the initial distance between the grip. This result is multiplied by 100 to provide a percent elongation.

The KOH absorption ratio and KOH absorption rate quantify the ability of the material to absorb KOH. To determine the absorption ratio of a sample, a 0.2 to 0.5 sample is weighed and then placed in a beaker containing 200 ml of 40% KOH for one hour at room temperature (RT). The sample is removed and excess electrolyte is allowed to drain for three minutes. The wet sample is then reweighed. The absorption ratio is the weight of the sample when wet divided by the weight of the sample when dry. To determine the absorption rate of a separator, a 1½ inch diameter disk of the separator is placed in a beaker full of 40% KOH. The time it takes to wet 90-100% of the sample area is recorded. Ninety seconds is the maximum time allowed for full saturation.

The oxygen stability, or resistance to oxidation, of a separator is important inasmuch as the use of a separator which is not stable towards oxidation in a battery will result in poor electrical performance, manifesting itself in short shelf and service life. The test used to measure the oxidation resistance is described in J. Cooper et al., eds., "Characteristics of Separators for Alkaline Silver Oxide-Zinc Secondary Batteries" (Air Force Aeropropulsion Laboratory, Dayton, Ohio, Sep. 1965), Chapter 8. The test requires that about 1 gram of dry sample be placed in a beaker containing 250 ml of 35% KOH and 5% $KMnO_4$ and submerged completely therein. With a glass cover, the beaker is maintained at 50° C. for 1 hour. The sample should then be washed in 5% oxalic acid, followed by DI water. The sample is subsequently dried and reweighed. The stability is determined by calculating the percent weight loss and changes in electrolytic resistance. The percent weight loss is provided by the formula:

$$\% \text{ weight loss} = \frac{W_i - W_f}{W_i} \times 100,$$

wherein $W_i$ is the initial weight and $W_f$ is the final weight of the sample.

The long-term stability at elevated temperature of a separator is a parameter that can be determined by examining the changes in dimension and electrolytic resistance of a sample after soaking the sample in KOH at 80° C. for 24 hours. Any large changes in these properties is an indication of degradation. To determine long-term stability, a separator sample of 4½×1½ inches is tested to determine its initial electrolytic resistance in 40% KOH. The sample is then immersed in 40% KOH and maintained at 80° C. for 24 hours. After cooling, the dimensions of the sample as well as its electrolytic resistance are measured. Any change in dimension is calculated as a percent expansion. This percent is determined by subtracting the area of the sample after soaking from the original area, dividing this result by the original area of the sample, and multiplying by 100.

The air permeability of a separator is a measurement of the time required for a fixed volume of air to flow through a standard area under light pressure. The procedure is described in ASTM D-726-58. The instrument used for this test is a Gurley Densometer Model 4110. To run the test, a sample is inserted and fixed within the densometer. The cylinder gradient is raised to the 100 cc (100 ml) line and then allowed to drop under its own weight. The time (in seconds) it takes for 100 cc of air to pass through the sample is recorded.

The thickness of a sample is the average of ten thickness measurements taken over a one square foot section of the sample.

The critical wetting surface tension (CWST) of a porous medium is the surface tension between that of the liquid which is absorbed and that of the liquid which is not absorbed within a predetermined amount of time by the porous medium. Thus, liquids with surface tensions lower than the CWST of a porous medium will spontaneously wet the medium upon contact and, if the medium is porous, will flow through readily. On the other hand, liquids with a surface tension higher than the CWST of a porous medium may not flow through at all at low differential pressures and, at sufficiently high differential pressures, may flow through unevenly. As disclosed in U.S. Pat. No. 4,880,548, the CWST of a porous medium may be determined by individually applying drops of a series of liquids with surface tensions varying by 2 to 4 dynes/cm and observing the absorption or non-absorption of each liquid over time.

A rewettability test was devised to measure the wettability of the separator after it is extracted with a solvent, e.g., water or methylene chloride. If the wettability is not permanent, the CWST will decrease and the electrolytic resistance will increase rapidly. To conduct this test, the CWST and electrolytic resistance of a separator sample are measured and recorded. A 4¼ × 1¼ inch piece is cut from that sample and immersed in water at 80° C. for 30 minutes. After cooling and further rinsing, the piece is air dried and the CWST and electrolytic resistance are measured. The CWST and electrolytic resistance are then compared with the values obtained from testing on the original sample. A second 4¼ × 1¼ inch piece is cut from the same separator sample and immersed in methylene chloride for 15 minutes at RT. The piece is then washed with DI water and air dried. The CWST and electrolytic resistance are then measured and compared with the values obtained from testing on the original sample.

Types of Batteries

The separators of the present invention may be substituted for separators currently used in a variety of batteries, including both flooded cell and starved electrolyte alkaline batteries. The separators may also be used in a variety of other batteries, e.g., nickel-cadmium, nickel-metal hydride, nickel-zinc, nickel-iron, zinc-air, silver-cadmium, zinc-manganese dioxide, and zinc-halogen (such as zinc-chlorine and zinc-bromine) batteries. The design and methods of constructing the aforesaid batteries are well known to those of skill in the art and will not be addressed herein.

The following examples further illustrate the present invention but, of course, should not be construed as in anyway limiting its scope. All percentages referred to herein, unless otherwise noted, are volume percentages.

EXAMPLE 1

This example illustrates the characteristics of microporous polyethylene membranes of the type useful in the preparation of the battery separator of the present invention.

Four microporous polyethylene membranes of varying properties were obtained from DSM under the designation Microporous UHMW-PE Hydrophobic Battery Separators. Each of the membranes were subjected to a variety of tests, and their characteristics are set forth in Table 1 below.

TABLE 1

| PROPERTIES | SUBSTRATE 1A | SUBSTRATE 1B | SUBSTRATE 1C | SUBSTRATE 1D |
|---|---|---|---|---|
| Thickness (mil) | 0.8 | 0.7 | 0.8 | 1.2 |
| Basis weight (g/m$^2$) | 8.59 | 6.55 | 3.9 | 7.26 |
| Tensile (lbs/in) | M.D. = 3.8 | 3.1 | 1.6 | 1.7 |
|  | T.D. 4.1 | 4.7 | 3.3 | 4.1 |
| Elongation (%) | M.D. = 16.3 | 21.9 | 25 | 23 |
|  | T.D. 21.8 | 17.8 | 15 | 12 |
| CWST (dynes/cm) | 30 | 30 | 33 | 30 |
| $K_L$ alcohol (psi) | 2.5 | 13 | 6–7 | 2–5 |
| m.p. (°C., DSC) | 140.5 | 142.8 | 143.4 | — |
| Heat Stability (% shrinkage) | | | | |
| 120° C./4 hrs | 16.60 | 29.69 | 89 | 25 |
| 100° C./8 hrs | 4.63 | 6.29 | 21 | 12 |
| 100° C./4 hrs | 1.56 | 8.96 | 20 | 13 |
| 80° C./16 hrs | 1.56 | 1.75 | 10 | 6 |

EXAMPLE 2

Two of the microporous polyethylene membranes of Example 1, namely substrates 1A and 1B, were run through a monomer bath which consists of 6% methacrylic acid, 10% hydroxyethyl-methacrylate, 0.05% diethyleneglycol dimethacrylate, 25% TBA, and 58.95% DI water at a speed of 30 feet per minute. The membranes became transparent instantly. The wet membranes were exposed to 10 Mrads of electron beam radiation. After exposure, the membranes were heated in an oven at 60° C. for one hour. The membranes were then rinsed in DI water for two hours, and dried in an air circulated oven at 60° C. for 20 minutes. The separators, designated 2A and 2B, respectively, were water wettable, having a CWST of 90 dynes/cm, and possessed a very low electrolytic resistance of 9 mΩ-in$^2$. As demonstrated in Example 1, the ungrafted membranes were hydrophobic, having a CWST of about 30 dynes/cm, and possessed very high electrolytic resistance.

Other characteristics of the present inventive separators A and B are set forth in Table 2, along with, for comparison, the characteristics o a commercially available separator, Celgard ® 3401 (Hoechst-Celanese).

TABLE 2

| Property | Example 2A | Example 2B | Celgard ® 3401 |
|---|---|---|---|
| Thickness (mil) | 1.5 | 1.0 | 1.0 |
| Base Weight (g/cm$^2$) | 10.87 | 7.75 | 16.87 |
| Tensile Strength (lb/in) | | | |
| MD | 4.5 | 4.5 | 19.2 |
| TD | 4.0 | 4.6 | 1.8 |
| Electrolytic Resistance (mΩ-in$^2$ 40% KOH at RT) | 9 | 8 | 22 |
| CWST (dyne/cm) | 90 < 5 sec | 90 < 1 min | 90 < 1 min |
| CWST after soaking in MeCl$_2$ 15 minutes | 86 < 10 sec | 86 < 10 sec | 32 |
| Gurley Air Flow (sec/10 ml) | 6 | 55 | 306 |
| KOH Absorption Rate (sec) | 6 | 8 | 6 |
| KOH Absorption Ratio (g wet/g dry) | 13.5 | 22.5 | 2.91 |
| KOH Expansion (%) | | | |
| RT    L | 0 | 0 | 0 |
| W | 0 | 0 | 0 |
| 80° C.    L | +0.6 | +0.5 | +0.5 |
| W | +0.8 | +0.8 | +0.8 |
| Thermal Stability (%) | | | |
| Dry: 80° C. 1 Hour | −1.3 | −1.3 | −2.5 |
| Wet in KOH: 80° C. 1 Hour | +1.4 | +1.3 | +1.3 |
| Long Term Stability (mΩ-in$^2$ at 80° C./24 hr) | | | |
| Initial Resistance | 9 | 8 | 21 |
| Final Resistance | 9 | 6 | 14 |

As shown, samples 2A and 2B are very thin in thickness and have a lower basis weight then Celgard ® 3401.

The samples do not show asymmetric tensiles in the machine and transverse directions. They exhibit a much higher gas permeability, and absorb much more KOH electrolyte than Celgard ® 3401. These properties are very important for starved secondary batteries.

EXAMPLE 3

A microporous polyethylene membrane of Example 1, namely substrate 1C, was rolled with Reemay ® interleaf and soaked in a monomer solution of 0.8% methacrylic acid, 0.5% hydroxyethylmethacrylate, 20% TBA, 1% polyethylene glycol (600) dimethacrylate, and 77.7% DI water. The roll was then evacuated for 15 minutes and sealed. Subsequently, the roll was exposed to gamma radiation at a dose rate of 10,000 rad/hr for 20 hours, to a total dose of 0.2 Mrad. The roll was unwound and rinsed in DI water for two hours. It was then dried in an air circulated oven at 60° C. for 20 minutes. The resulting separator was water wettable and possessed a thickness of 0.8 mil and an electrolytic resistance of 36 mΩ-in$^2$. This sample shows that hydrophilicity can be achieved by gamma radiation grafting. The dimensional stability of the separator in different electrolytes is shown in Table 3.

TABLE 3

| Electrolyte | Length Expansion | Width Expansion |
| --- | --- | --- |
| 40% KOH | 0% | 0% |
| 28% NaOH | 0% | 3% |
| 20% H$_2$SO$_4$ | 5.5% | 0% |

EXAMPLE 4

A microporous polyethylene membrane of Example 1, namely substrate 1C, was passed through a monomer bath comprising 10% methacrylic acid, 1.5% polyethyleneglycol dimethacrylate 600, 30% TBA, and 58.5% DI water at 30 feet per minute. The membrane became transparent immediately. The wet membrane was then exposed to electron beam radiation to a total dose of 10 Mrad. The resulting separator was rinsed in DI water for one hour and dried in an air circulated oven at 60° C. for 20 minutes. The resulting separator was water wettable and possessed a thickness of 0.9 mil and an electrolytic resistance of 14 mΩ-in$^2$. The electrolytic resistance at elevated temperatures of the separator is shown in Table 4.

TABLE 4

| Temperature | Electrolytic Resistance (mΩ-in$^2$) |
| --- | --- |
| 25° C. | 17 |
| 40° C. | 9 |
| 50° C. | 5 |
| 60° C. | 6 |
| 70° C. | 6 |

The separator is relatively stable in KOH electrolyte at temperatures between 40° and 70° C. and, further, possesses a very low electrolytic resistance.

EXAMPLE 5

A microporous polyethylene membrane of Example 1, namely substrate 1D, was exposed to electron beam radiation under a nitrogen inert atmosphere to a total dose of 10 Mrad, and then dipped through a monomer bath consisting of 10% MA, 30% TBA, and 60% distilled water. The grafted membrane was left standing for 48 hours at room temperature, after which it was rinsed in DI water for 2 hours and air dried overnight. The separator was water wettable, having a CWST of 85 dynes/cm. The separator was wetted within 15 seconds with a 40% KOH solution and was instantly wetted with 40% concentrated H$_2$SO$_4$ solution. The separator had good uniformity and possessed an electrolytic resistance of 10 mΩ-in$^2$. The separator was compatible after 24 hours at 50° C. in both KOH electrolyte and concentrated H$_2$SO$_4$.

EXAMPLE 6

Two linear feet of polyethylene membrane of Example 1, namely substrate 1D, was rolled into a roll with paper interleaved therewith. This roll was then introduced into a test tube which contained a 10% acrylic acid monomer aqueous solution. The tube was evacuated with a vacuum pump for 5 minutes and sealed. The tube and its contents were irradiated in a Co-60 vault at a dose rate of 10,000 rads/hr for 20 hours. After the radiation treatment, the grafted membrane was washed with hot water and dried. The resulting separator membrane was water wettable and possessed an electrolyte resistance of 25 mΩ-in$^2$. This example shows that acids other than methacrylic acid can be used for grafting to obtain hydrophilic separators.

EXAMPLE 7

The procedure of Example 6 was replicated except that a 10% methacrylic acid monomer aqueous solution was used instead of the 10% acrylic acid monomer aqueous solution. The resulting separator was water wettable and possessed an electrolytic resistance of 12 mΩ-in$^2$ in 40% KOH and 18 mΩ-in$^2$ in 40% H$_2$SO$_4$. The separator was stable in both KOH and H$_2$SO$_4$ electrolytes. After a week in KOH and H$_2$SO$_4$, the separator had an electrolytic resistance of 10 mΩ-in$^2$ in 40% KOH and 27 mΩ-in$^2$ in 40% H$_2$SO$_4$. The physical integrity of the separator remained intact.

EXAMPLE 8

A roll of microporous polyethylene membrane of Example 1, namely substrate 1B, was exposed to an electron beam under inert nitrogen atmosphere (oxygen concentration less than 40 ppm) to a total dose of 10 Mrads. The membrane was then immediately passed through a solution bath containing 10% hydroxyethylmethacrylate, 6% methacrylic acid, 0.05% diethylene glycol dimethacrylate, 25% TBA, and 58.95% deionized water. The roll was stored under nitrogen for 4 days at room temperature. It was subsequently trickle washed for 4 hours and air dried. The resulting separator was instantly water wettable and exhibited excellent uniformity in electrolytic resistance throughout its entire width and length. Further characterization of this separator is provided in Table 5, along with a comparison to the commercially available Celgard 3401 ® separator.

TABLE 5

| Property | Celgard ® 3401 | Example 8 |
| --- | --- | --- |
| Film Type | microporous | microporous |
| Thickness (mil) | 1.0 | 1.8 |
| Base Weight (g/m$^2$) | 16.9 | 13.5 |
| Electrolytic Resistance (mΩ-in$^2$ 35% KOH at 23° C.) | 15 | 9 |
| Absorption (%) of 35% KOH | | |
| Blot Dry Method | 80 | 290 |
| Gould Method (%) (2 min. drain) | 220 | 650 |

TABLE 5-continued

| Property | Celgard ® 3401 | Example 8 |
|---|---|---|
| Expansion (%) in 35% KOH | | |
| L | +0.1 | +0.5 |
| W | +0.4 | +1.2 |
| Gurley Air Flow (sec/10 ml) | 350 | 130 |
| Tensile Strength (lb/in) | | |
| MD | 19.2 | 4.5 |
| TD | 1.8 | 4.6 |
| Elongation (%) at Break | | |
| MD | 44 | 19.4 |
| TD | 536 | 16.0 |
| KOH stability (%) in 35% KOH 1 hour boiling (wt. loss) | −8 | 0 |
| Expansion (%) in air | | |
| 80° C. for 1 hour  L | −3.6 | −.8 |
| W | 0 | 0 |
| 100° C. for 1 hour  L | −4.6 | −0.9 |
| W | 0 | 0 |
| Heat Sealability | Yes | Yes |

As shown, the separator of the present invention has a lower electrolytic resistance than Celgard ® 3401. It also absorbs more KOH electrolyte and has a higher gas permeability. Tis example also demonstrates another mode of electron beam grafting of the substrate to prepare a separator in accordance with the present invention.

EXAMPLE 9

This example demonstrates the superior electrical resistance at very low temperatures provided by separators of the present invention. Example 8 demonstrated that the present inventive separator exhibited a lower electrical resistance at room temperature than Celgard ® 3401, which is a well known, commercially available, microporous battery separator. The lower resistance provided by the separator of the present invention enables a battery to be discharged and charged at higher rates, which is a very desirable property. The electrical resistance of the present inventive and commercially available separators was further compared at low temperatures. At subzero temperatures, the electrical resistance of the present inventive separator increased at a much lower rate with decreasing temperature as compared to the Celgard ® 3401 separator. At low temperatures, therefore, batteries utilizing separators of the present invention will possess higher energy and power capacity than batteries utilizing the conventional separator. The electrical resistance of the present inventive separator of Example 8 and the Celgard ® 3401 separator at various temperatures are set forth in Table 6.

TABLE 6

| Separator | 25° C. | −10° C. | −20° C. | −30° C. | −40° C. |
|---|---|---|---|---|---|
| Example 8 | 9 mΩ-in$^2$ | 26 | 44 | 86 | 158 |
| Celgard ® 3401 | 20 | 56 | 85 | 155 | 310 |

EXAMPLE 10

This example demonstrates the superior oxidation stability possessed by separators of the present invention at elevated temperatures.

A sample taken from the separator prepared in Example 8 was cut into a 2"×4" strip and heated in a 5% $KMnO_4$/35% KOH beaker for 1 hour at 50° C. A similar sample was taken from a Celgard ® 3401 separator and similarly treated. Both samples were washed with 5% oxalic acid to dissolve any residual $KMnO_4$ product and rinsed with DI water. The % weight loss, initial electrical resistance, and final electrical resistance were determined before and after exposure of both samples, and the results of these tests are set forth in Table 7

TABLE 7

| Separator | % Wt. Loss* | Initial Resistance (mΩ-in$^2$) | Final Resistance (mΩ-in$^2$)* |
|---|---|---|---|
| Example 8 | 0.15 | 9 | 7 |
| Celgard ® 3401 | 15 | 20 | >>5000 |

*average of three separate tests

These results demonstrate that batteries utilizing separators of the present invention will have longer service life than conventional separators when exposed to the same conditions. The Celgard ® 3401 separator had a much higher weight loss and became substantially nonconductive under conditions which did not significantly affect the separator of the present invention.

EXAMPLE 11

This example demonstrates the permanency of hydrophilicity possessed by the separator of the present invention. Unlike other separators that achieve hydrophilicity by adding wetting agents or hygroscopic agents in the membrane, which agents can leach from the separator, rendering the separator hydrophobic again, the separator of the present invention exhibits hydrophilicity that is not susceptible to degradation by leaching. Two tests were performed to illustrate that fact. The first test involved extracting a sample with water at 80° C. for 30 minutes, and the other test involved extracting the sample with methylene chloride at room temperature for 15 minutes. The CWST and electrical resistance values for samples of the present inventive and Celgard ® 3401 separators were determined, and the results are shown in Table 8.

TABLE 8

| SEPARATOR | INITIAL CWST (dyne/cm) | CWST AFTER WATER EXTRACTION (dyne/cm) | CWST AFTER MeCl$_2$ EXTRACTION (dyne/cm) | INITIAL RESISTANCE (mΩ-in$^2$) | RESISTANCE AFTER MeCl$_2$ EXTRACTION (mΩ-in$^2$) |
|---|---|---|---|---|---|
| Example 2A | 90 | 90 < 5 sec | 86 | 9 | 10 |
| Example 2B | 90 | 90 < 5 sec | 86 | 8 | 10 |
| Celgard ® 3401 | 90 | 90 > 5 sec  87 10 sec | 32 | 22 | >5000 |

It is readily apparent that the Celgard ® 3401 separator looses its hydrophilicity and becomes hydrophobic upon exposure to an organic solvent such as methylene chloride. Moreover, its electrolytic resistance rises sharply. In contrast, there is no noticeable change in the present inventive separator upon similar exposure to an organic solvent.

EXAMPLE 12

This example demonstrates the superiority of the separator of the present invention in the area of electrochemical performance under high temperature-low temperature cycling conditions.

An electrochemical cell was constructed with a zinc negative plate and a silver oxide positive plate using the separator prepared in Example 8, as well as the Celgard ® 3401 separator. An aqueous solution of 40% KOH was used as the electrolyte. The open-circuit voltage was measured and recorded. The cell was heated to 60° C. for 30 minutes, and then cooled at 5° C. for 75 minutes. After warming to room temperature, the open-circuit voltage was measured and recorded a second time. This cycle was repeated a number of times, with the open-circuit voltage being monitored as in the first cycle. After cycling, the cell was dissembled, and the separators were examined.

As the results shown in Table 9 indicate, the open-circuit voltage for the cell using the separator of the present invention did not fall off as rapidly as that which used the Celgard ® 3401 separator under such heat-cool cycles. The use of the separator of the present invention provides a leveling off at voltage of about 1.50 volts and does not fall below 1.10 volts. The battery using the Celgard ® 3401 separator has its voltage falls well below 1.50 volts to under 1.10 volts.

This result can be explained by a combination of effects. First, the silver oxide plate of the battery with the Celgard ® 3401 separator gets reduced to a white color more rapidly, thereby oxidizing the wetting agents in the separator to a darker color. Second, the expansion and contraction of the electrolyte helps to leach out the wetting agents which are not permanently bonded to the Celgard ® 3401 separator. Third, a portion of oxide on the plate surfaces oxidizes the wetting agents of the Celgard ® 3401 separator, thereby causing the voltage to drop.

TABLE 9

| Open-Circuit Voltage (volts) | Example 8 | Celgard ® 3401 |
|---|---|---|
| Initial | 1.69 | 1.70 |
| Heat Cycle 1 | 1.69 | 1.68 |
| Cold Cycle 1 | 1.59 | 1.42 |
| Heat Cycle 2 | 1.59 | 1.45 |
| Cold Cycle 2 | 1.55 | 1.25 |
| Heat Cycle 3 | 1.56 | 1.28 |
| Cold Cycle 3 | 1.52 | 1.10 |
| Heat Cycle 4 | 1.54 | 1.15 |
| Cold Cycle 4 | 1.52 | 1.06 |
| Overnite at RT | 1.69 | 1.70 |
| Heat Cycle 5 | 1.69 | 1.68 |
| Cold Cycle 5 | 1.59 | 1.42 |
| Heat Cycle 6 | 1.59 | 1.45 |
| Cold Cycle 6 | 1.55 | 1.27 |
| Heat Cycle 7 | 1.56 | 1.28 |
| Cold Cycle 7 | 1.52 | 1.10 |
| Heat Cycle 8 | 1.54 | 1.15 |
| Cold Cycle 8 | 1.52 | 1.06 |
| Cell dissembled | | |
| Separator | light brown | very dark brown |
| Ag$_2$O plate | some parts still black | mostly white color |

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claim is:

1. A battery separator comprising an ultra-high molecular weight polyethylene microporous membrane radiation grafted with a monomer, the separator having the following properties:
   (a) a porosity ranging from about 50% to about 95%,
   (b) an average pore size ranging from about 0.1 to about 20 microns,
   (c) an electrolytic resistance ranging from about 1 to about 50 mΩ-in$^2$,
   (d) a maximum weight loss of 1% and a change in electrolytic resistance of no greater than 25% after immersion in an aqueous solution of 35% KOH and 5% KMnO$_4$ at 50° C. for 1 hour,
   (e) a tensile strength of from about 3.5 to about 5.5 lb/in in both length and width directions,
   (f) a KOH absorption ratio of from about 5 to about 30,
   (g) a Gurley air permeability of about 1 to 300 sec/10 ml, and
   (h) a thickness from about 0.5 mil to about 10 mil.

2. The battery separator according to claim 1, wherein the separator shrinks no greater than about 2% in length and 1% in width after being maintained at a temperature of 80° C. for one hour.

3. The battery separator according to claim 2, wherein the separator has a CWST ranging from about 72 to about 95 dynes/cm.

4. The battery separator according to claim 3, wherein the CWST remains substantially constant after extraction in boiling water for 30 minutes.

5. The battery separator according to claim 3, wherein the electrolytic resistance ranges from about 5 to about 20 mΩ-in$^2$.

6. The battery separator according to claim 1, wherein the monomer is selected from the group consisting of monomers having a carboxylic acid group.

7. The battery separator according to claim 6, wherein the monomer is selected from the group consisting of acrylic acid, methacrylic acid, maleic acid, fumaric acid, itaconic acid, citraconic acid, crotonic acid, sodium acrylate, sodium methacrylate, potassium methacrylate, hydroxy alkyl acrylates, hydroxy alkyl methacrylates, and mixtures thereof.

8. The battery separator according to claim 6, wherein the monomer is selected from the group consisting of acrylic acid, methacrylic acid, hydroxyethyl methacrylate, hydroxypropyl methacrylate, hydroxyethyl acrylate, hydroxypropyl acrylate, and mixtures thereof.

9. A battery comprising at least one pair of electrodes of opposite polarity, an electrolyte, and a separator of claim 1 located between the electrodes of opposite polarity.

10. The battery according to claim 9, wherein the battery is a vented nickel-cadmium battery.

11. The battery according to claim 9, wherein the battery is a vented nickel-metal hydride battery.

12. The battery according to claim 9, wherein the battery is a vented nickel-zinc battery.

13. The battery according to claim 9, wherein the battery is a vented nickel-iron battery.

14. The battery according to claim 9, wherein the battery is a zinc-air battery.

15. The battery according to claim 9, wherein the battery is a silver-cadmium battery.

16. The battery according to claim 9, wherein the battery is a zinc-manganese dioxide battery.

17. The battery according to claim 9, wherein the battery is a zinc-halogen battery.

18. The battery separator of claim 1, wherein said membrane has a tortuous pore structure.

19. The batter separator of claim 18, wherein said membrane has a stacked lamellar leaf-like structure with respect to the pores.

20. The battery separator according to claim 19, wherein the monomer is selected from the group consisting of monomers having a carboxylic acid group.

21. The battery separator according to claim 20, wherein the monomer is selected from the group consisting of acrylic acid, methacrylic acid, maleic acid, fumaric acid, itaconic acid, citraconic acid, crotonic acid, sodium acrylate, sodium methacrylate, potassium methacrylate, hydroxy alkyl acrylates, hydroxy alkyl methacrylates, and mixtures thereof.

22. The battery separator according to claim 20, wherein the monomer is selected from the group consisting of acrylic acid, methacrylic acid, hydroxyethyl methacrylate, hydroxypropyl methacrylate, hydroxyethyl acrylate, hydroxypropyl acrlate, and mixtures thereof.

23. A battery comprising at least one pair of electrodes of opposite polarity, an electrolyte, and a separator of claim 19 located between the electrodes of opposite polarity.

* * * * *